United States Patent

Moncomble et al.

(10) Patent No.: US 9,473,640 B2
(45) Date of Patent: Oct. 18, 2016

(54) COMMUNICATIONS PROCESS OF AN AUDIOVISUAL MESSAGE, AND COMMUNICATIONS SYSTEM

(71) Applicant: France Telecom, Paris (FR)

(72) Inventors: Ghislain Moncomble, Plestin-les-Grèves (FR); Jean-Pierre Julien, Louannec (FR)

(73) Assignee: FRANCE TELECOM, Paris (FR)

( * ) Notice: Subject to any disclaimer, the term of this patent is extended or adjusted under 35 U.S.C. 154(b) by 146 days.

(21) Appl. No.: 13/922,708

(22) Filed: Jun. 20, 2013

(65) Prior Publication Data

US 2014/0003588 A1   Jan. 2, 2014

(30) Foreign Application Priority Data

Jun. 21, 2012 (FR) ...................... 12 55863

(51) Int. Cl.
  *H04M 1/64* (2006.01)
  *H04M 3/533* (2006.01)
  *H04L 12/58* (2006.01)

(52) U.S. Cl.
  CPC ............ *H04M 3/533* (2013.01); *H04L 51/066* (2013.01); *H04L 51/10* (2013.01); *H04L 51/18* (2013.01)

(58) Field of Classification Search
  USPC .............................. 379/88.11, 88.13; 709/203
  See application file for complete search history.

(56) References Cited

U.S. PATENT DOCUMENTS

| 2003/0016658 | A1 | 1/2003 | Creamer et al. |
| 2006/0195505 | A1* | 8/2006 | Jerbi ............... H04L 12/5895 709/203 |
| 2009/0049495 | A1 | 2/2009 | Ketterling et al. |

FOREIGN PATENT DOCUMENTS

| EP | 1126721 A1 * | 8/2001 | ......... G06F 17/2247 |
| FR | 2839598 A1 | 11/2003 | |
| GB | WO 03030023 A2 * | 4/2003 | ......... G06F 17/3089 |
| WO | 03030023 A2 | 4/2003 | |

OTHER PUBLICATIONS

French Preliminary Search Report and Written Opinion dated Nov. 19, 2013 for corresponding French Patent Application No. 12 55863, filed Jun. 21, 2012.

* cited by examiner

*Primary Examiner* — Van D Huynh
(74) *Attorney, Agent, or Firm* — David D. Brush; Westman Champlin & Koehler, P.A.

(57) ABSTRACT

A transmission process and device are provided for transmitting an enriched audio or audiovisual message. The process includes converting enriching information configured to enrich the content of an initial audio or audiovisual message and processing information linked to the enriching information into at least one multimedia insertion message, inserting the multimedia insertion message at least into the audio or visual content of the initial message so as to create an enriched message, and transmitting the enriched message via a communications system from the transmission device to at least one receiving device.

11 Claims, 3 Drawing Sheets

COMMUNICATIONS PROCESS OF AN AUDIOVISUAL MESSAGE, AND COMMUNICATIONS SYSTEM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

GENERAL TECHNICAL FIELD

The invention relates to a transmission process and a process for receiving an enriched audio or audiovisual message. The invention also relates to devices and transmission and/or receiving terminals, as well as servers.

PRIOR ART

In numerous communications systems, it is necessary to transmit audio or audiovisual messages, accompanied by enriching information, such as for example text information. This is useful for example in voicemail systems of mobile telephony operators.

It is known for over a century to send text information in audio form by means of different coding, such as for example via Morse alphabet. However, these solutions are no longer adapted to modern needs, such as for example the transmission of voicemail over mobile telephony terminals.

These days, when a mobile telephony user leaves a voice message on the voicemail of another user, he can accompany his message with text information such as an Internet address, by pronouncing the name of the address in his message intended for the recipient.

This solution has several disadvantages. On the one hand, this text information, dictated in the voice message, prolongs and perturbs the voice message. Also, there can be the risk of confusion as to the exact nature of the text information, such as for example on the exact spelling of the address.

To partially rectify these disadvantages, it is known in communications systems of telephony operators to add in the database adjacent to each voice message a new rubric for storing text information. The communications system comprises means for adding text information in line with depositing the voice message, to store it in this new rubric.

When a user listens to his voice messages over his terminal, reading means display the text information linked to the voice message simultaneously with the voice message.

Similar technologies exist for the dissemination of text information simultaneously with dissemination of radio or webcast messages, and for interpretation of this information when it is received, such as for example in patent FR 2839598.

However, these solutions need consequent adaptations at the level of communications systems infrastructure.

For example, at the level of a voicemail server, it is necessary to modify databases and the operation of different voicemail servers used by each of the different operators on their different networks and countries, which is long and costly.

SUMMARY

An exemplary embodiment of the invention proposes a transmission process of an enriched audio or audiovisual message executed by a transmission device, characterised in that it comprises:
converting enriching information, intended to enrich the content of an initial audio or audiovisual message, and processing information linked to the enriching information, into at least one multimedia insertion message,
inserting the multimedia insertion message at least into the audio or visual content of the initial message, so as to create an enriched message,
transmitting the enriched message via a communications system from the transmission device to at least one receiving device.

The invention sends audio or audiovisual messages, accompanied by enriching information, and avoids the need to substantially modify the infrastructures of communications systems. A wide variety of enriching information can be sent without it being necessary to complicate existing communications systems.

According to an embodiment, processing information transmitted by the communications system is coded according to an audio or visual code linked to the content of said processing information. The incorporation of information is therefore transparent for the user who has no additional processing action to carry out. Also, later processing of the processing information by a receiving device is made easier.

According to an embodiment, insertion of the multimedia insertion message into audio or visual content of the initial audio or audiovisual message comprises the insertion of at least one audio or visual separation tag between the multimedia insertion message and the audio or visual content of the initial audio or audiovisual message. Later processing of the enriched message by the receiving device is now improved and made easier, effectively reducing processing time and resources.

According to an embodiment, the enriched message transmitted by the transmission device comprises an orderly predefined succession of processing information and enriching information. Later processing of the enriched message by the receiving device is also improved and made easier.

The invention also relates to a process for receiving an enriched audio or audiovisual message executed by a receiving device, characterised in that it comprises:
extracting at least one multimedia insertion message containing enriching information and processing information and an initial audio or audiovisual message from the received enriched message,
reading the initial audio or audiovisual message, and
processing the enriching information so as to enrich the reading or the presentation of the initial audio or audiovisual message with said enriching information, the processing of the enriching information being determined as a function of the processing information contained in the multimedia insertion message.

The invention introduces new functionalities to message exchanges and especially to the use of these messages in the communications system without the infrastructure of the communications system needing to be changed.

The invention transparently processes enriching information of an audiovisual message for the user, that is, the latter has no additional processing action to carry out and the processing put in place is not apparent for the user.

According to an embodiment, the processing information comprises:
information on the category of enriching information transmitted in the enriched audiovisual message,
setting information of the display of the enriching information to be made at the level of the receiving terminal.

This type of information makes processing at the level of the receiving device easier, and reduces processing time and the volume of data to be transferred.

According to an embodiment, the enriching information comprises a link to an address accessible via a communications network.

According to an embodiment, extraction of the multimedia insertion message from audio or visual content of the enriched audio or audiovisual message comprises extraction of at least one audio or visual separation tag between the multimedia insertion message and the audio or visual content of the initial audio or audiovisual message.

According to an embodiment, the enriched message received by the receiving device comprises an orderly predefined succession of processing information and enriching information.

The processing of the enriched message by the receiving device is now improved and made easier, reducing processing time and resources.

The invention also relates to a transmission device of an enriched audio or audiovisual message, characterised in that it comprises:
conversion means, configured for converting
enriching information, intended to enrich the content of an initial audio or audiovisual message, and
processing information linked to the enriching information, into at least one multimedia insertion message,
processing means, configured to insert the multimedia insertion message at least into the audio or visual content of the initial message, so as to create an enriched message,
communication means, configured to transmit the enriched message to at least one receiving terminal.

The invention also relates to a server comprising such a device.

The invention also relates to a receiving device of an enriched audio or audiovisual message, characterised in that it comprises:
means for extracting at least one multimedia insertion message containing enriching information and processing information and an initial audio or audiovisual message from the received enriched message,
means for reading the initial audio or audiovisual message, and
means for processing the enriching information to enrich the reading or the presentation of the initial audio or audiovisual message with said enriching information,
processing of the enriching information being determined as a function of the processing information contained in the multimedia insertion message.

The invention also relates to comprising a transmission and/or receiving device such as described previously.

The invention also relates to a computer program comprising instructions for execution of the transmission process and/or the receiving process, when a processor executes the program.

The invention also relates to a readable recording medium by a processor on which a program comprising instructions for execution of the transmission process and/or of the receiving process is recorded.

The invention applies to different types of communications systems and especially to communications systems by mobile telephony, in particular to voicemail servers.

PRESENTATION OF THE FIGURES

Other characteristics, aims and advantages of the invention will emerge from the following description which is purely illustrative and non-limiting and which must be considered in light of the attached drawings, in which.

DETAILED DESCRIPTION

Communication Systems and Devices

Figure 1:
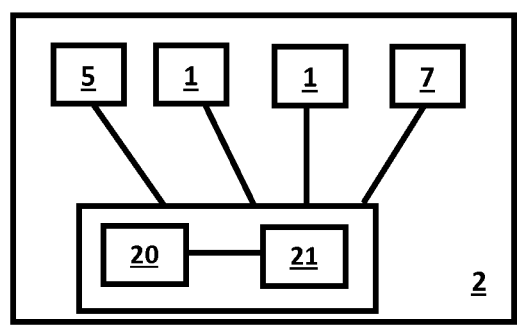
FIG. 1 is a representation of an embodiment of a transmission device according to the invention.
Figure 2:
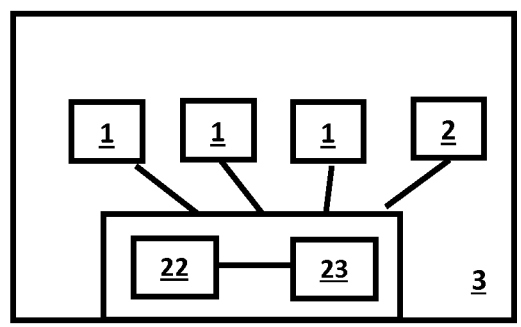
FIG. 2 is a representation of an embodiment of a receiving device according to the invention.
Figure 3:
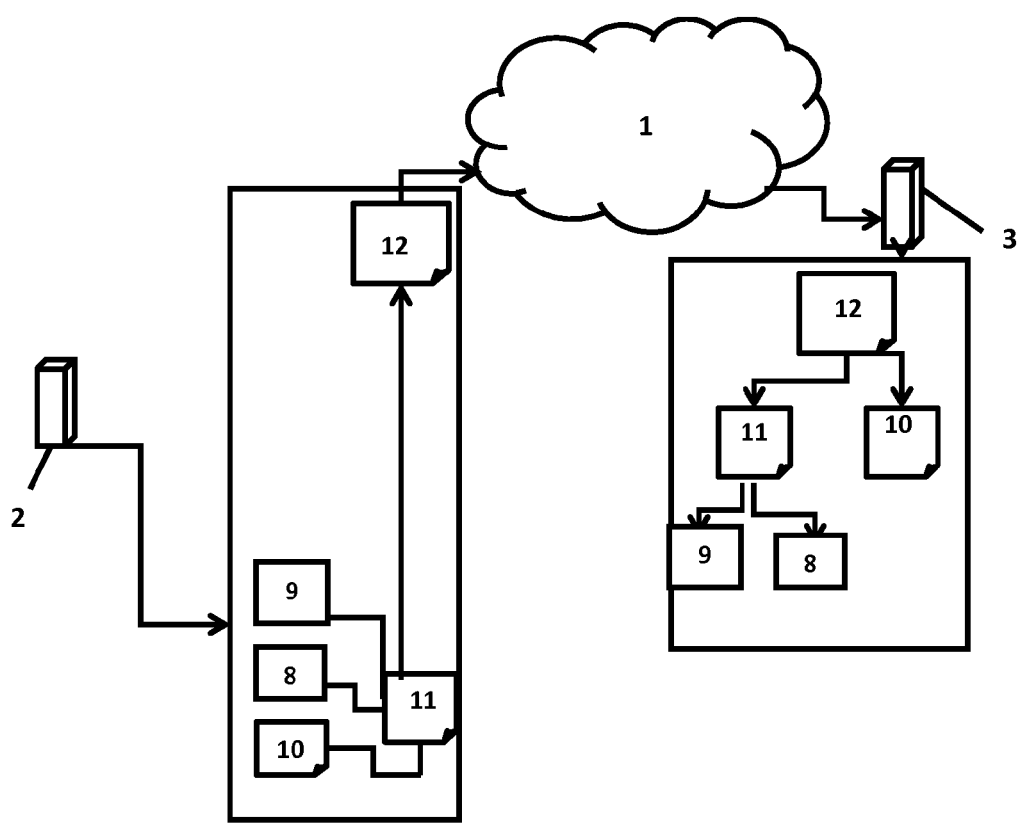
FIG. 3 is a representation of an embodiment of a communication process according to the invention.

FIGS. 1 to 3 schematically illustrate different communication devices for executing the different communications processes described hereinbelow.

FIG. 1 is a schematic representation of a transmission device 2 of an enriched audio or audiovisual message.

The device 2 comprises conversion means 5. These conversion means 5 are configured to convert enriching information 8, intended to enrich the content of an initial audio or audiovisual message 10 comprising at least one audio content, and processing information 9 linked to the enriching information 8, into at least one multimedia insertion message 11, as explained hereinbelow.

The device 2 also comprises insertion means 6, configured to insert the multimedia insertion message 11 at least into the audio or visual content of the initial message 10 so as to create an enriched message 12.

The device 2 also comprises communication means 7, configured to transmit the enriched message 12 to at least one receiving terminal 4. These communication means 7 are conventional and depend on the type of communication used (network, Bluetooth, Internet, etc.).

Where required, the transmission device 2 comprises interaction means 18 with a user (for example of keyboard type, interface, monitor, etc.).

The different means of the device can especially comprise one or more processors 20, linked to at least one memory 21 storing a computer program, for the execution of tasks performed by these means. This processor and this memory can be common to these different means, or not.

FIG. 2 is a schematic representation of a receiving device 3 of an enriched audio or audiovisual message 12.

This device comprises extraction means 15. These means are configured for extracting at least one multimedia insertion message 11 containing enriching information 8 and processing information 9 and an initial audio or audiovisual message 10 from the received enriched message 12.

The device 3 also comprises reading means 24. These means are configured for reading the initial audio or audiovisual message.

The device 3 comprises processing means 16, configured for processing the enriching information 8 so as to enrich the reading or presentation of the initial audio or audiovisual message 10 with said enriching information 8, the processing of the enriching information 8 being determined as a function of the processing information 9 contained in the multimedia insertion message 11.

The reading means 24 comprise elements for restoring the message to be read, for example of monitor or loudspeaker type.

The device 3 comprises communications means 19, similar to the abovementioned means 7.

The device 3 also comprises, where required, interaction means with a user (keyboard, interface . . . ), similar to the abovementioned means 18.

The different means of the device can especially comprise one or more processors 22 linked to at least one memory 23 storing a computer program, for execution of tasks performed by these means.

In an embodiment, the transmission device 2 is integrated into a terminal. Similarly, the receiving device 3 is integrated into a terminal. One terminal can comprise both a transmission device 2 and a receiving device 3.

For example be these can terminals for mobile telephony, or computers, or televisions or television servers, or radios or radio servers, or audio or audiovisual messaging servers, or any other adapted communications device.

The different means described can be localised directly on the terminal, if this has the necessary processing capacities, or even memory, or else be accessible, for example by means of requests in client-server mode, from a localised server somewhere in the communications network.

In an embodiment, the transmission device forms part of a server, for example of computer type.

In an embodiment, shown in FIG. 3, the transmission 2 and receiving 3 devices communicate by means of a communications system 1. The communications system 1 depends on applications: Internet network, mobile telephony system, communications system via Bluetooth, etc.

The invention also relates to a computer program comprising instructions for execution of the transmission process and/or of the receiving process such as described hereinbelow, when the program is executed by a processor. This program can especially be stored in a memory of the transmission and/or receiving device.

Similarly, the invention also relates to a readable recording medium by a processor on which a program is recorded comprising instructions for execution of the transmission process and/or of the receiving process such as described hereinbelow.

Transmission Process

Figure 4:
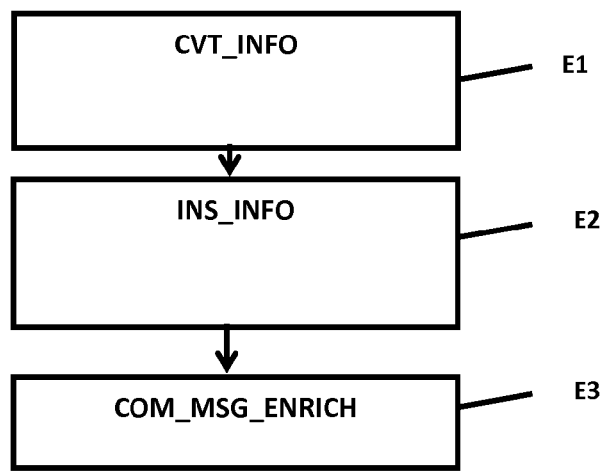
FIG. 4 is a representation of an embodiment of a transmission process according to the invention.

FIGS. 3 and 4 illustrate an embodiment of a transmission process of an audio or audiovisual message between a transmission device 2 and a receiving device 3, via a communications system 1. These devices are integrated into transmission and receiving terminals.

Audio or audiovisual message means a message comprising at least one audio content, such as for example a voice message. Where required, this message can, but not necessarily, also comprise information with is visual, static (images/photos . . . ) or dynamic (videos . . . ), which corresponds to the term "audiovisual message".

Steps of an embodiment of the transmission process will now be described. Different embodiments will be described hereinbelow.

A first step E1 consists of converting enriching information 8, intended to enrich the content of an initial audio or audiovisual message 10, or even modifying or enriching its future presentation on the terminal of the recipient, and processing information 9 linked to the enriching information 8, into at least one multimedia insertion message 11. As described hereinbelow, the multimedia message 11 comprises audio insertion content, accompanied where required by visual insertion content (photo, video . . . ). In an embodiment, only processing information 9 is converted.

Converting means that all or part of the information must be transferred to a predefined format. Some enrichment information 9 has not however necessarily been need to be converted, especially if the latter are directly supplied in a format for their later insertion (step E2).

The enriching information 8 is for example text information intended to enrich the initial message 10 when the receiving device 3 reads it.

The processing information 9 characterises the processing (synchronisation, nature of the display, opening of Internet addresses, etc.) of enriching information 8, to be carried out during reading of the initial message 10 by the receiving device 3.

The first step E1 is conducted by the conversion means 5, described previously. These conversion means 5 are integrated into the transmission device 2, and/or into an external processing unit.

A second step E2 consists of inserting each multimedia insertion message 11 at least into the audio content of the initial message 10 so as to create an enriched audio or audiovisual message 12, called enriched message for the remainder of the description This step is conducted by the abovementioned insertion means 6, which can be integrated into the transmission device 2, and/or into an external processing unit.

A third step E3 consists of transmitting the enriched message 12 via the communications system 1 from the transmission device 2 to at least one receiving device 3.

This step is conducted by the communications means 7 in collaboration with the communications system 1.

According to a particular embodiment of the invention, the enriched message 12 transits via a messaging server, voice for example.

Receiving Process

Figure 5:
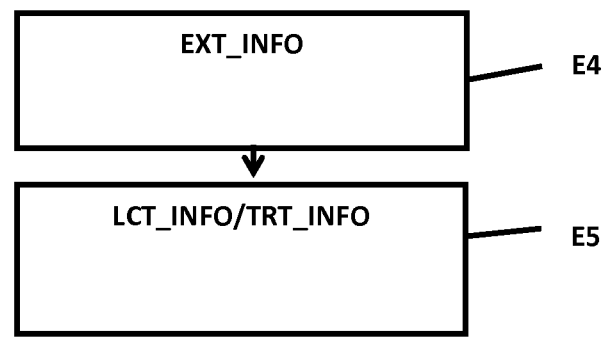
FIG. 5 is a representation of an embodiment of a receiving process according to the invention.

A process for receiving an enriched audio or audiovisual message 12 executed by the receiving device 3 will now be described in reference to FIGS. 3 and 5.

A step E4 consists of extracting at least one multimedia insertion message 11 containing enriching information 8 and processing information 9 and an initial audio or audiovisual message 10 from the received enriched message 12.

This extraction enables the receiving device 3 on the one hand to retrieve the initial audio or audiovisual message 10, and on the other hand the enrichment and processing information 8, 9. So, during this extraction, the enriching information 8 and the processing information 9 is extracted, then deleted from the initial message 10.

This step E4 is conducted by the extraction means 15 which can be integrated into the receiving device 3, and/or into an external processing unit.

A step E5 consists of reading the initial audio or audiovisual message 10 at the level of the receiving device 3 and processing the enriching information 8 so as to enrich or improve the reading or the presentation of the initial audio or audiovisual message 10 with said enriching information 8.

The reading of the initial message 10 is done by the reading means 24.

The processing means 16, present in the receiving device 3, and/or in an external processing unit, for example employ reading of the enriching information 8 simultaneously with the reading of the initial audio or audiovisual message 10.

According to another particular embodiment of the invention, the processing means 16 allow differentiated display of the different sequences comprising the initial audio or audiovisual message, for example in the case of composed messages, originating for example from a succession of messages and responses to messages.

The processing of the enriching information 8 is executed as a function of the processing information 9 extracted from the enriched message 12, and linked to the enriching information 8. This processing information 9 for example defines, but not limitingly, the nature of the reading or display of the enriching information 8, the duration of this display, its synchronisation with the initial audio or audiovisual message 10, etc.

For example, enriching information 8 of text type is displayed simultaneously to the initial audio or audiovisual message 10, such as for example text subtitles of a voice message, the display being managed by the processing means 16 because of the processing information. According to another example, the enrichment can also be a photo or a video which can be displayed directly from its URL (Uniform Resource Locator) provided in the enriching information and predefined display processing. Multiple other examples are also possible.

In the event where the enriching information 8 also comprises information visual static or dynamic, for example images, photos, or videos, and the initial message 10 is an audiovisual message, the process comprises the following steps.

A conversion step E1 consists of converting the enriching information 8 and the processing information 9 linked to the enriching information 8 into a multimedia insertion message 11.

A second step E2 consists of inserting the multimedia insertion message 11 into the audio and video content of the initial audiovisual message 10 so as to create an enriched message 12.

For example, if the enriching information 8 is a video with sound, the conversion means 5 convert this enriching information 8 and the associated processing information 9 into a multimedia insertion message 11 (audiovisual) which comprises both video insertion content and audio insertion content.

The video insertion content comprises the video content of the enriching information. Audio insertion content can comprise the audio content of the enriching information and the audio content coding the processing information 9.

The video insertion content is inserted into the video content of the initial audiovisual message 10, and the audio insertion content is inserted into the audio content of the initial audiovisual message 10.

The enriching information can also be one or more static images, accompanied by audio content.

The enriching information can also be one or more static images, without audio content.

A third step E3 consists of communicating the enriched message 12 via the communications system 1 from a transmission device 2 to at least one receiving device 3.

A fourth step E4 consists of extracting the enriching information and the processing information from the enriched audiovisual message received by the receiving device.

At the level of the receiving device, a fifth step E5 consists of reading the initial audiovisual message, and simultaneously processing the enriching information so as to enrich the reading of the initial audiovisual message with the enriching information, the processing of the enriching information being determined as a function of the processing information extracted from the enriched message, and linked to the enriching information.

For example, a video comprising sound (enriching information) is read simultaneously to an initial audiovisual message.

Different embodiments of different steps of the transmission and receiving processes will now be described.

Enrichment and Processing Information

The enrichment information 8 can especially be supplied manually by a user via the interaction means 18 present for example on his transmission device or terminal.

According to an alternative, the enrichment information 8 is not supplied manually by a user, but aggregated automatically from a database accessible via the communications system 1, or is generated from an application present on the device or terminal.

The device or terminal connects to the database via its communication means 7 or downloads this enriching information 8 via the communications system.

For example, an advertiser publishes an initial audio message to be broadcast to terminals (televisions, telephones, etc.), and enrichment information 8 of this audio message (visual information on the products, display price, access plan, etc.).

In another embodiment, the initial audio messages 10 are voice messages from users on a mobile telephony communications system, and the enriching information 8 is the links between the different messages, and the associated history, which lists a set of voice exchanges.

A wide range of enrichment information 8 can be used.

This can be text information, for example.

This can also be audio information, such as music or an audio message.

This can also be video information, comprising sound. Alternatively, it can be a static image associated with sound.

According to an example, a user wants to transfer a photo, along with an initial audiovisual message, accessible via an Internet link (of URL type). The enriching information 8 then comprises this link Internet.

Other examples include a telephone number, any Internet address, subtitling of an audio message, for example for a final hard-of-hearing recipient, a text translation of an audio message, for example for a foreign final recipient.

Other examples of enriching information 8 include the reference of another voice message, or additional information such as the geolocalisation of the user of the sending terminal during sending, or any other useful information.

Some enrichment information 8, different in nature, can be supplied for the same initial message 10, for example an Internet address and an explanatory text.

Numerous other examples of types of enrichment information 8 are possible, according to the needs of users and of the administrator of the communications system 1.

The variety of enriching information 8 makes it complex to find a simple definition of the processing to be carried out at the level of the receiving device 3, by the terminal and/or by an external processing unit in communication with the terminal. Substantial investments would be necessary to define each processing event, according to the nature and content of the enriching information 8. Processing common to all the enriching information 8 is possible, for example of raw display type, but has the disadvantage of not adapting optimally to each case.

To rectify this technical difficulty, the enriching information 8 is combined with processing information 9, said processing information 9 being able to be easily processed by the transmission and receiving devices, via the various abovementioned processing, conversion, and extraction means.

Therefore, it is not necessary to substantially modify the infrastructure of communications systems 1 to then enrich the initial audiovisual messages 10. Only adapted processing means must be inserted at the level of the terminals and/or of the communications server, or even uniquely reconfigured, if they are already present.

The processing information 9 can be supplied to the communications server 1 similarly to what has been described for the enriching information 8, that is, manually via interaction means in the terminal, or automatically, by being retrieved by the transmission device 2 from databases or dedicated applications.

The processing information 9 is linked to the enriching information 8, since, as described hereinbelow, it characterises the required processing of the enriching information 8 at the level of the receiving device 3.

Variants are however possible which link different enriching information. For example, the order of this information is used to process a series of successive or predefined information (corresponding enrichment and processing content).

According to another example, two pieces of enriching information can have the same application chronology (for example two titles or subtitles to be superposed, or a subtitle and a musical background at the same moment . . . ).

Different types of processing information 9 can be used in the communication process.

According to an example, this is information on the type of display of enriching information 8 to be carried out at the level of the receiving terminal 3. This is for example the indication to be displayed:
  subtitles (which are stored as enriching information 8),
  a web page whereof the address is stored as enriching information 8,
  a photo whereof the address or the content is stored as enriching information 8,
  the name of a program to run, whereof the name or address are stored as enriching information 8,
  a telephone number to be called, whereof the number is stored as enrichment information 8.

In an embodiment, some processing information 9 is combined with the same enriching information 8, meaning that several processing events will have to be operated on this enriching information 8 during the processing step by the processing means 16 at the level of the receiving device 3.

According to another example, the processing information 9 includes information on the category of enriching information transmitted in the enriched audiovisual message 12.

Examples of category include: address, telephone number, bank number, code, etc. The same enriching information 8 can belong to several categories, such as for example an Internet address and a photo.

In an embodiment, the processing means 16 exploit the processing information 9 relative to the category of enriching information to determine the processing to be applied to the enriching information 8.

For example, enriching information 8 of "Internet address" type, combined with processing information 9 of "photo display" type, indicates that the processing means 16 must download the photo from the Internet address and display it on the receiving terminal 3.

An advantage of transmitting the category of enriching information is to limit the need in terms of quantity of enriching information.

For example, the "Internet address" category avoids systematically converting the set of characters "http://" by the conversion means 5 for sending. In effect, the processing means 16 identify the "Internet address" category and automatically add this extension to the address transmitted as enriching information 8.

According to another embodiment, the processing information 9 comprises setting information of the display of the processing information to be carried out at the level of the receiving terminal 3.

This information is parameters defining the display of processing information 9 to be carried out at the level of the receiving terminal 3.

For example, this can be the font colour of the text or on the one hand of the text of the enriching information. In this case, the parametering information comprises two values: the type of parameter (here the font colour) and its value (red, for example).

According to another embodiment, the processing information 9 comprises information on the time sequence of the display of the enriching information 8 to be carried out at the level of the receiving terminal 3.

This is for example time information indicating the portion of the initial audiovisual message 10 during which the processing means 16 must display the enriching information 8. A typical example relates to the text subtitling of an audio message 10, information on the time sequence synchronising the display of subtitles with the audio message 10. Some time information can be transmitted, and the latter can overlap, where required.

The processing information 9 cited previously does not constitute an exhaustive list, and other types of processing information 9 can be transmitted. For example, the processing information 9 can comprise information relative to the urgency of the message, or to its advertising character, or again settings associated with the size of the monitor of the receiving terminal, or the operating system of the receiving terminal.

In an embodiment, the absence of processing information 9 indicates that a default mode must be executed at the level of the receiving device 3. In this case, the processing constitutes a constant display of the enriching information 8, such as for example integral and unique subtitling.

According to an alternative variant, for which the receiving devices 3 are connected permanently to the communications system 1, the enrichment information 8 can be limited to a single Internet address for accessing enrichment information 8, optionally coupled to the corresponding processing information 9.

As a variant, two Internet addresses are transmitted, one for each piece of enrichment information 8 and one for the corresponding processing information 9.

These latter variants exhibit increased simplicity, but need to have a permanently accessible communications system 1.

To limit these effects, a degraded mode is possible combining these embodiments. So, the processing 9 and/or enrichment information 8 is transmitted via an Internet address. In the event of the communications network 13 being unavailable, a default processing mode is executed.

"Conversion" Step

According to the first step E1, conversion means 5 generate a multimedia insertion message 11 from enriching information 8 and processing information 9, which translates this information. The conversion has been defined hereinabove.

The conversion means 5 are those used in the prior art, and depend on the conversion used.

According to an embodiment, coding the enriching information 8 can utilise coding of multifrequency type, each letter of the alphabet for example being defined by a combination of frequencies as for the code DTMF (dual-tone multi-frequency). The conversion means 5 in this case are therefore coding tools capable of transforming text sequences into voice frequencies.

In another embodiment, the conversion means 5 code the enriching information 8 by successions of sound of different lengths, in the image of Morse code.

In another embodiment, the conversion means 5 perform coding of alphabetic type, a vocal synthesis limited to spelling the different successive letters of information in the preferred language (language provided in parameter in the processing information). For example the expression "bonjour" is translated hereinbelow by the following phonemes: "b", "o", "n", "j", "o", "u", and "r".

In yet another embodiment, the conversion means 5 read the enriching information 8 in the language provided in parameter, which allows audio coding.

Combinations of these different codings are possible, of course.

In the event where the enriching information 8 comprises visual, static or dynamic information, the conversion means convert this enriching information and the associated processing information into a multimedia insertion message 11 which comprises both video insertion content and audio insertion content.

The video insertion content comprises the video content of the enriching information. The audio insertion content comprises the audio content of the enriching information and the audio content coding the processing information 9, according to the coding described hereinbelow.

As for the processing information 9, according to an embodiment the latter form the subject matter of specific audio coding by the conversion means 5 so it can be recognised in the extraction and reading steps conducted at the level of the receiving terminal.

This specific audio coding can consist of predefined coding from one of the techniques cited earlier. This audio code specific to the content of said processing information decodes the processing information during extraction and reading.

It can also consist of a set of sound documents such as for example music notes, or by way of variant music notes originating from a predefined instrument (for example piano, or violin), or even a specific refrain. This is therefore audio coding which unequivocally defines the processing to be carried out.

As a variant, the conversion means 5 convert the processing information 9 into a combination of audio codes and positioning of codes. The positioning of codes corresponds for example to standardisation for simplifying the processing (example, code 1 for processing, code 2 for the processing parameter, if any, code 3 for time chronology, . . . , code 8 for the enrichment content itself) and code 9 for the end of the insertion sequence (and optionally the start of a new sequence). If two codes are present successively, this indicates the absence of information (if for example the code 9 directly follows the code 8 it is because there is no enrichment content, but only processing events).

For example, the musical note "Re" is used to indicate that the processing information expresses the fact that the enriching information is a text.

The note "Re", followed by the vocalisation of the digit "6", indicates that the corresponding duration will be 6 seconds.

In another example, the set of vocalised characters "7", "+", and "4" indicates that the duration of the enrichment information 8 will extend from the 7th to the 11th second of the initial audiovisual message 10.

In yet another example, the note "Re", followed by the vocalisation of the digit "6", followed by another specific refrain indicates that text will be used as subtitling for 6 seconds.

According to an embodiment, all processing information 9 transmitted by the communications system 1 is coded according to an audio code specific to the content of said processing information. The coding is identical at the level of sending and at the level of receiving of the enriched message 12, which makes processing and reading easier at the level of the receiving device 3.

According to another particular embodiment of the invention, the processing information 9 forms the object of specific visual coding by the conversion means 5. For example, the processing information can be coded in the form of a 2D code interpretable by a dedicated application, for example a code of QR type (Quick Response code). A QR code is a matrix code intended to be read by a barcode reader, telephone or webcam and can be quickly decoded by the terminal.

In the particular case of parametering information of the display of processing information to be carried out at the level of the receiving device 3, the latter is potentially very plentiful to the extent where numerous processing events can be carried out at the level of the receiving device 3 by the processing means 16. In this case, a list of possible parameters is stored in the communications system, and it is the order of this list of parameters which forms the object of the codification (for example parameter 1, parameter 2 . . . ) by the conversion means 5, to the extent where said parameters are different from one processing event to the other. Knowing the processing to be applied via other processing information, the processing means 16 deduce therefrom the parameters to be used in this list.

In an embodiment, the audio content of the enriched message 12 first comprises the processing information 9 converted into audio form, then the enrichment information 8 also converted into audio form.

So, the conversion means 5 convert the enriching information 8, intended to enrich the content of the initial audiovisual message 10 and the processing information 9 linked to the enriching information, into one or more multimedia insertion messages of audio and/or visual messages type.

Insertion means 6 insert the insertion message 11 into the initial audiovisual message 10, in the audio or visual content of this message. These processing means 6 are means of processor type linked to a software tool for handling and cutting audio or visual files. Where required, if the enriching or processing information comprises visual information, the software tool is capable of handling fixed or dynamic visual content.

According to a particular embodiment of the invention, when the processing information corresponds to visual codes, the processing information is inserted into the visual content of the audiovisual message.

In an embodiment, the processing means 6 insert the multimedia insertion message 11 at a predefined place into the audio or visual content of the initial audiovisual message 10, such as for example at the start of the message.

Figure 6:
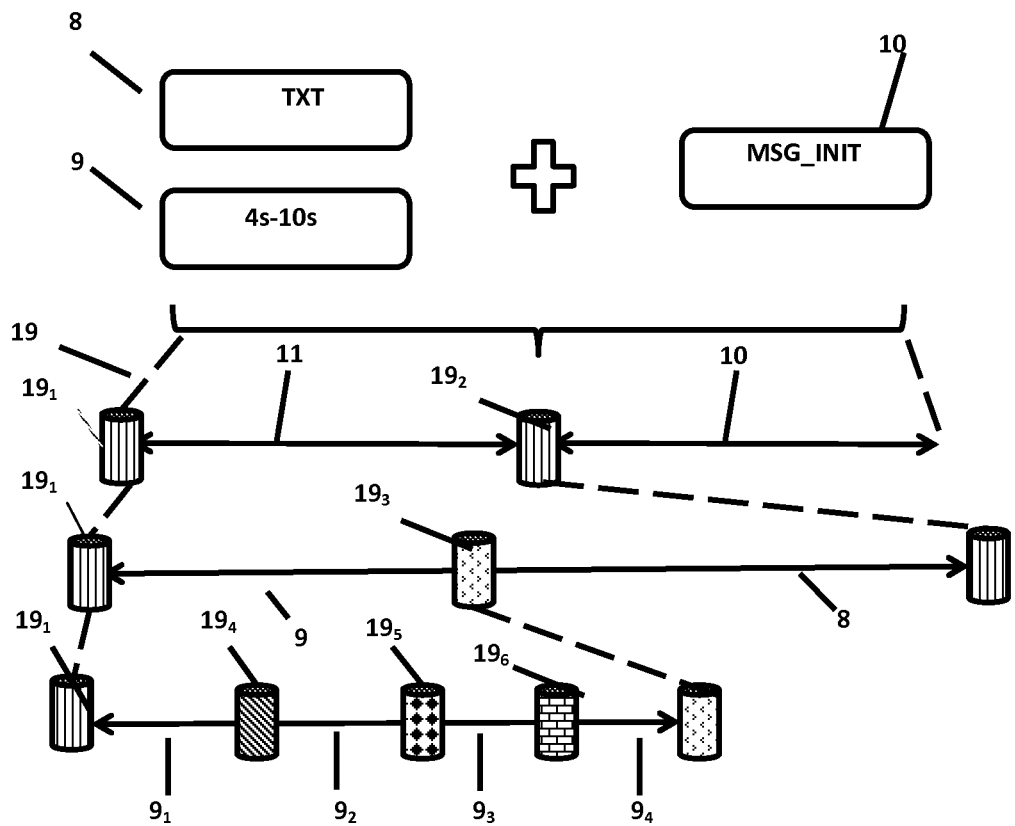
FIG. 6 is a representation of an embodiment of enrichment of an initial audio message.

FIG. 6 is an embodiment of the conversion of enrichment and processing information 8, 9 into a multimedia insertion message, and its insertion into the audio content of an initial message 10.

The enriching information 8 in this example is subtitles of an initial audio or audiovisual message 10.

The processing information 9 indicates the temporal positioning and display duration of these subtitles, relative to the initial audio message 10.

The conversion means 5 convert the enrichment and processing information 8, 9 into an audio insertion message 11, which the processing means 6 couple at the start of the content of the initial audiovisual message 10 to create an enriched audio message 12.

The processing means 6 frame the audio content of the multimedia insertion message 11 by audio separation tags 19, in this case an initial tag $19_1$ and a final tag $19_2$. These audio tags are audio markers indicating the start and end of the audio insertion message 11.

In this embodiment, at its start the audio insertion message 11 comprises an audio sequence relative to the processing information 9, followed by an audio sequence relative to the enrichment information 8. These audio sequences are also separated by an audio tag $19_3$, to eliminate any extraction or reading error by the receiving device 3.

Advantageously, the conversion means 5 convert the processing information 9, such that the latter is coded in the form of an orderly and predefined succession. This also eliminates any extraction or reading error by the receiving device 3.

In this example, the audio sequence relative to the processing information 9 first comprises audio codes $9_1$ relative to the type of processing, then to the category $9_2$ of processing information, then to the setting $9_3$ of the display of processing information, then information $9_4$ on the timing of the display of enriching information to be carried out at the level of the receiving device 3. Each of these rubrics of processing information 9 terminates in a specific audio tag ($19_4$, $19_5$, $19_6$) optionally identical, the last tag being the end tag of the audio subsequence of processing information 9. In this embodiment, it is the order of the tags and the number of tags which can be fixed and standardised, which will determine the processing events to be applied directly at the level of the receiving device.

In an embodiment, if one of the rubrics of the processing information 9 were absent for any reason, the corresponding audio tags are inserted into the audio insertion message 11, but are not preceded by any audio information relative to this rubric.

This organisation of chaining avoids the multiplication of audio codes.

In an embodiment, the same audio code (for example an alphabetic multifrequency code or DTMF) is used to code the "display of a photo" processing and to code the type of "text" information. No confusion is possible for the encoding or the reading, given that the first audio code follows the first insertion tag $19_1$, and the second follows another insertion tag $19_4$. This order can therefore be standardised between the transmission and receiving devices, as well as the quantity of processing information supplied systematically, even if this information is absent.

In an embodiment, the enriched message 12 comprises a plurality of audio insertion messages, in a header for example.

Insertion Step

Insertion means 6 insert the multimedia insertion message 11 at least into the audio content of the initial audio or audiovisual message 10.

This insertion of an audio sequence within another audio sequence is undertaken by means of a simple audio editing software tool.

If the insertion message 11 is an audiovisual message, the visual part of this message is inserted into the visual content of the initial message, and the sound part is inserted into the audio content of the initial message. Where required, visual tags surround the visual part of the insertion message for easier subsequent extraction.

In an embodiment, each multimedia insertion message 11 is inserted into the initial audiovisual message 10 at a time instant corresponding to the future time position of the preferred effect for this enrichment information 8 during reading at the level of the receiving terminal 3.

Therefore, an audio insertion message 11 corresponding to future subtitling from the second 6 will be inserted from the second 6 of the initial audiovisual message 10.

An advantage is avoiding the necessity of storing this particular processing information 9 within the enriched message 12.

Another advantage is being able to propose automatedly, and without any modification to the databases of voice messaging servers of different operators, functionalities of response type to received messages, or responses with corrections to received messages.

In such a case of use, the enrichment information 8 is information of timestamp type of the initial sending of messages, coordinates of transmitters, or the like. The processing information 9 retrieves transmitters from the receiving terminals and defines the differentiated display of the voice components on the receiving terminal.

Within the scope of this usage, each voice component (for example, a message which is responded to vocally, and the initial message and voice response set of the recipient) is concatenated without modifying its history, and the multimedia insertion messages 11 are therefore by default distributed over the entire enriched message 12.

According to another variant, the multimedia insertion messages 11 are all positioned after each other, on the one hand as a function of their generic character, on the other hand as a function of their chronology, before or after the audio content of the initial audiovisual message 10. The same process applies to visual information. This variant simply retrieves this information during the extraction step by truncating it directly without having to process the entire enriched message 12. The generic character means enriching information 8 which characterises the entire initial audio or audiovisual message 10, relative to those characterising only part of this message.

According to a variant, each audio insertion message 11 is delimited by audio tags, helping to distinguish it from the initial audiovisual message, at the start and/or end, as per case.

The resulting file audio is then recorded according to the state of the art.

According to a variant, the resulting audio file forms the object of a new file, separate to the original audio target file of the initial audiovisual message 10.

This double recording has several points of interest. On the one hand, this allows use of the process for executing functionalities of response type to voice received messages.

On the other hand, all receiving devices do not necessarily have the necessary processing capacities.

In an embodiment, sending the enriched audiovisual message 10 comprises a verification step for compatibility with the receiving device 3 via the communications system 1. In the event of incompatibility, only the initial audiovisual message 10 is sent.

In an embodiment, each audio insertion message 12 transmitted by the communications system 1 comprises an orderly predefined succession of processing information 9 and enriching information 8. For example, the processing information is coded first, followed by the enriching information. In the processing information, a predefined order can also be respected according to the content or the type of processing information.

Communication Step

The enriched message 12 is communicated via the communications system 1 from one transmission device 2 to at least one receiving device 3. The communication means are conventional: antennas, relay antennas, communication via Internet, Bluetooth network, fibre optics, etc.

If the communications system 1 is a mobile telephony system, the enriched message 12 is transmitted according to current techniques of the state of the art. The user of the receiving device 3 retrieves the message, for example, in his voicemail box. As a variant, the message is communicated in the space reserved for welcome messages in the voicemail box of the user.

In an embodiment, the enriched audiovisual message 12 is retrieved by means of visual voicemail (VVM—Visual Voice Mail), from which the user displays the list of messages intended for him.

By way of variant, a specific application, for example downloaded by the recipient user from a receiving terminal 3 from an application store (Apple store, Android Market . . . ) is necessary for retrieving then processing said enriched audiovisual message 12 from the voicemail server of the user.

Extraction Step

After receipt of the enriched audiovisual message 12 by the receiving device 3, extraction means 15 extract the enriching information and the processing information from the enriched audiovisual message received by the receiving terminal.

This is reverse processing of the insertion step.

In an embodiment, this step and the successive steps are triggered when the user selects the preferred message in a list of received messages.

As a variant, said steps are triggered as soon as a new message is available in the list of messages received at the level of the receiving terminal.

To prevent these steps from being repeated numerous times, previously processed messages can be marked as "done" at the level of the receiving terminal to avoid redundant processing.

The extraction means 15 identify the audio content of the multimedia insertion message 11 by means of sound tags.

The extraction means 15 are used to separate the audio content of the multimedia insertion message 11 from the audio content of the initial audiovisual message 10.

In the event where visual enrichment information 9 has been inserted into the video content of the initial audiovisual message, the extraction means 15 also extract this content.

The recognition of audio tags delimiting an audio insertion message, or as a variant the series of audio insertion messages, needs an audio comparison component, for example a comparison component of audio spectra.

Where required, the recognition of visual tags delimiting a visual insertion message needs a visual comparison component.

In the variant according to which multimedia insertion messages 11 are positioned according to different time instants in the original audio target message, the extraction means 15 also retain the information relative to the start time instant of each multimedia insertion message 11.

For each of the multimedia insertion messages 11 retrieved on completion of the preceding step the extraction means 15 also analyse said sequence to extract the enriching information and the processing information therefrom.

The functions undertaken by these extraction means 15 depend on the choices made upstream for the conversion of information.

If audio coding of enriching information consists of letter-by-letter voice synthesis in a predefined language, or as a variant transmitted in parameter, the extraction means 15 comprise a component of letter-by-letter voice recognition in the predetermined language (or as a variant if the latter has been transmitted in processing parameter, once the latter is determined).

The advantage of letter-by-letter is of course the high level of reliability of the method, superior to full-text voice recognition (direct pronunciation of words and not of letters).

If alphabetic multifrequency coding or DTMF has been used, the extraction means 15 recognise and interpret said codes to extract the corresponding texts therefrom.

The same applies if all or part of the audio coding used is composed of predefined music notes, or as a variant predefined audio refrains.

The extraction means 15 are especially configured to distinguish the start and end sound tags of the different sound sequences of the audio insertion message (tags separating processing information from enriching information, and tags separating out processing information), and, where required, to distinguish the visual tags.

Finally, the extraction means 15 provide a set of information composed of enriching information and different processing information relative to this enriching information.

Each of said groups of information is connected to an initial audiovisual message.

Also, on completion of the extraction step, the receiving device 3 has the initial audiovisual message 10, compatible with what it was prior to insertion of audio insertion messages.

Reading Step

Reading means 24 are configured to read the initial audiovisual message, and processing means 16 are configured for processing the enriching information 8, the processing of the enriching information being determined as a function of the processing information extracted from the enriched audiovisual message, and linked to the enriching information, and this at the level of the receiving device 3.

For example, successive subtitling information, (optionally subtitling information in different languages) will be displayed successively according to the preferred time sequence during the progress of hearing said audiovisual target message 10.

According to another example, a voice message composed of different successive voice sequences will be displayed according to a tree view distinguishing the different successive voice sequences, with the timestamp information and coordinates of their respective transmitters relative to said successive voice sequences.

According to another example, a series of photos, optionally with subtitlings and scrolling following a scenario, is present throughout hearing of the message, synchronised with the progress of said message.

An infinite number of exemplary embodiments is possible.

The processing means 16 have a processor and a software tool for interpreting the processing information for reading the enriching information as is expected by the transmitter of the initial audiovisual message.

The processing means 16 recognise the nature and the content of the processing information 9 due to their predefined audio coding, as has been described previously. They therefore have a memory storing the predefined coding of all processing information, and the processing to be performed for all information.

Securing of Exchanges

Several variants of architecture can be employed to secure the process relative to data loss. These data losses can especially be associated with the quality of the network, or the coding of the audio band during the transmission of data.

In an embodiment, the conversion means 5 add a sub-audio control sequence in the enriched audiovisual message 12, for example at the end. This control sub-sequence contains information relative for example to the number of characters defined in the enriching information 8 of the enriched audiovisual message, which after extraction verifies if the transfer of information has been completed correctly.

In another embodiment, each insertion sequence corresponding to the coding of enriching or processing information is doubled by using two different information codings. After extraction at the level of the receiving device, the data of the two insertion sequences relative to the same information coding are compared to verify if there is an error.

In case of a detected error, according to a first variant the reading step of the initial audiovisual message 10 accompanied by enriching information 8 is not conducted.

According to another variant, the step reading is conducted in a degraded way, an alert message being also displayed to show probable anomaly.

Examples of Application

The communication process enriches audio or audiovisual messages without modifying the infrastructure of the communications systems. It can be added to existing infrastructures.

The process is applied especially to communications telephony operator systems, and in particular to voicemail servers.

In particular, the process enriches voice messages by a large quantity of information, such as text information for example. The process also exploits the potential of said enriching information by means of different appropriate processing events, without any modification necessary to infrastructure of subjacent voice messaging. Modification of databases to achieve similar results would involve high costs and implementation times.

The process can also be executed for other systems for dissemination of audio or audiovisual documents, such as for example radio podcasts broadcast to intelligent terminals.

The invention claimed is:

1. A receiving process of an enriched audio or audiovisual message executed by a receiving device, wherein the process comprises:
    extracting from audio and/or video content of the received enriched audio or audiovisual message:
        at least one multimedia insertion message containing enriching information and processing information, and
        an initial audio or audiovisual message,
    reading the initial audio or audiovisual message, and
    processing the enriching information so as to enrich the reading or a presentation of the initial audio or audiovisual message with said enriching information, wherein the processing of the enriching information is determined as a function of the processing information contained in the multimedia insertion message.

2. The receiving process according to claim 1, in which the processing information comprises at least one of:
    information on a category of enriching information transmitted in the enriched audiovisual message, or
    setting information of a display of enriching information to be carried out at a level of the receiving device.

3. The receiving process according to claim 1, in which the enriching information comprises a link to an address accessible via a communications network.

4. The receiving process according to claim 1, in which the extraction of the multimedia insertion message from the audio or visual content of the enriched audio or audiovisual message comprises the extraction of at least one audio or visual separation tag between the multimedia insertion message and the audio or visual content of the initial audio or audiovisual message.

5. The receiving process according to claim 1, in which the enriched message received by the receiving device comprises an orderly predefined succession of the processing information and the enriching information.

6. The receiving process according to claim 1, wherein processing information is coded according to an audio or visual code linked to the content of said processing information.

7. The receiving process according to claim 1, wherein at least one audio or visual separation tag is present between the multimedia insertion message and the audio or visual content of the enriched message.

8. The receiving process according to claim 1, wherein the enriched message comprises an orderly predefined succession of processing information and enriching information.

9. A receiving device of an enriched audio or audiovisual message, wherein the device comprises:
    means for extracting from audio and/or video content of the received enriched audio or audiovisual message:
        at least one multimedia insertion message containing enriching information and processing information, and
        an initial audio or audiovisual message,
    means for reading the initial audio or audiovisual message, and
    means for processing the enriching information so as to enrich the reading or a presentation of the initial audio or audiovisual message with said enriching information, the processing of enriching information being determined as a function of the processing information contained in the multimedia insertion message.

10. A terminal comprising a device according to claim 9.

11. A recording device that is readable by a processor and comprises a program having instructions executing a method of receiving an enriched audio or audiovisual message executed by a receiving device when the program is executed by a processor, the process comprising:
- extracting from audio and/or video content of the received enriched audio or audiovisual message:
  - at least one multimedia insertion message containing enriching information and processing information, and
  - an initial audio or audiovisual message,
- reading the initial audio or audiovisual message, and
- processing the enriching information so as to enrich the reading or a presentation of the initial audio or audiovisual message with said enriching information, wherein the processing of the enriching information is determined as a function of the processing information contained in the multimedia insertion message.

* * * * *